Oct. 13, 1936.     A. C. PARKER     2,056,981
GLASS GATHERING DEVICE
Filed Aug. 27, 1931     2 Sheets-Sheet 1
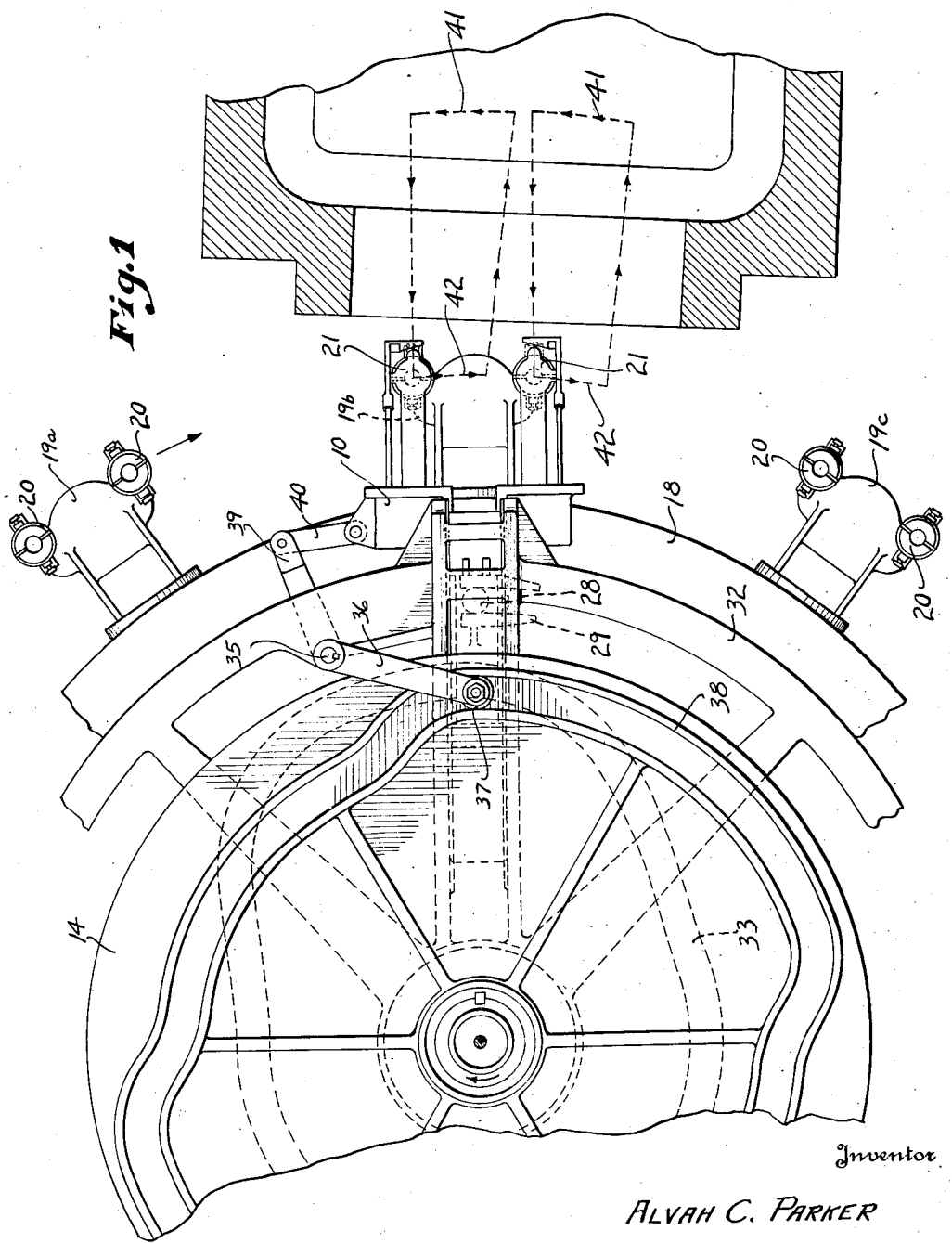
Inventor
ALVAH C. PARKER
By Owen - Owen
Attorneys Oct. 13, 1936.  A. C. PARKER  2,056,981
GLASS GATHERING DEVICE
Filed Aug. 27, 1931   2 Sheets—Sheet 2
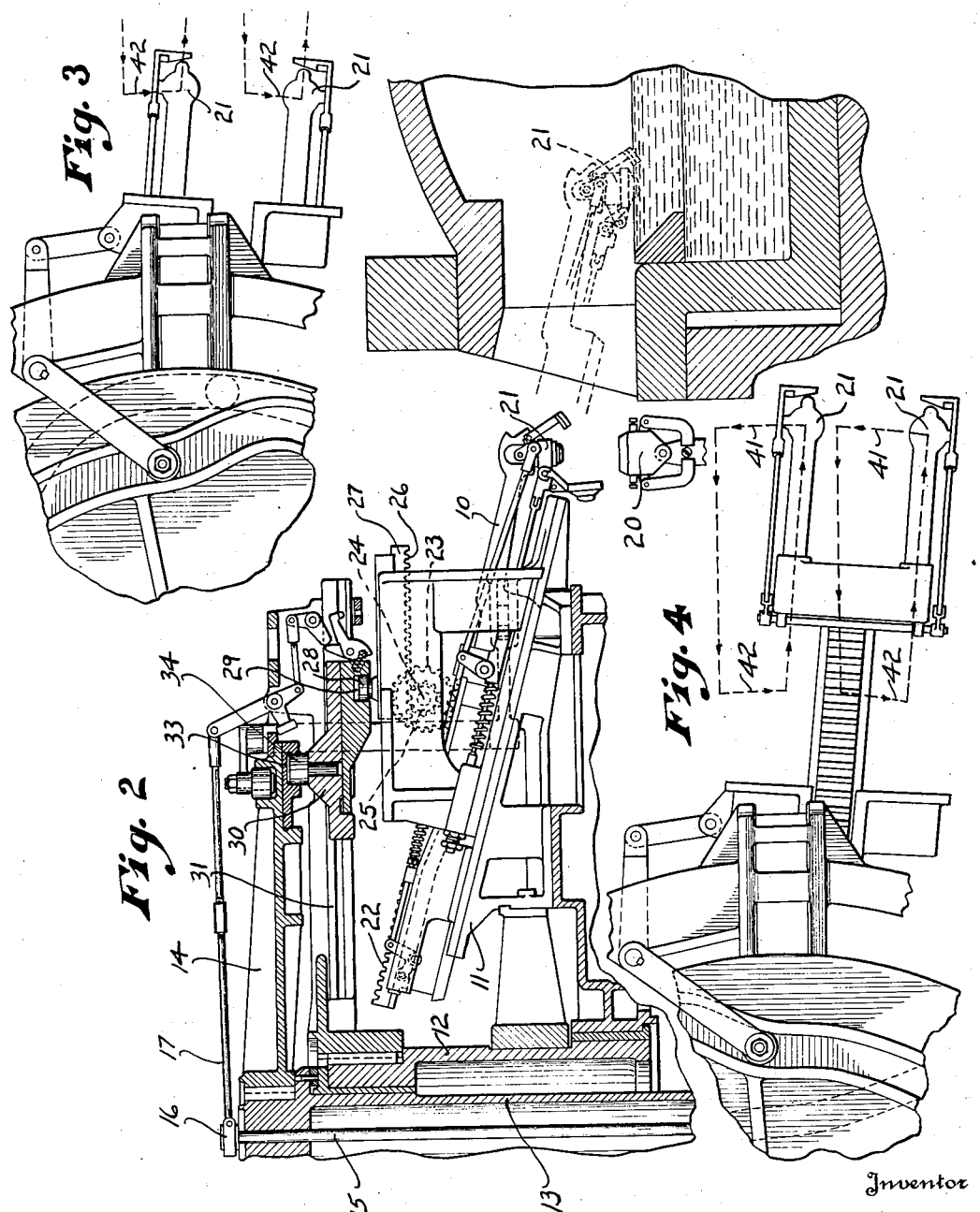
Inventor
ALVAH C. PARKER
By Owen-Owen
Attorneys Patented Oct. 13, 1936

2,056,981

UNITED STATES PATENT OFFICE 2,056,981

GLASS GATHERING DEVICE

Alvah C. Parker, Toledo, Ohio, assignor, by mesne assignments, to Libbey Glass Company, Toledo, Ohio, a corporation of Ohio Application August 27, 1931, Serial No. 559,625

4 Claims. (Cl. 49—5)

This application relates to a glass gathering device and more particularly to an improvement in gathering devices for bulb machines and the like. This invention is an improvement upon that disclosed in Kadow Patent 1,223,393 dated April 24, 1917, which in turn is an improvement over the gathering device disclosed in Kadow Patent 1,527,556 dated February 24, 1925. The details of the mechanism with which this improvement is particularly designed to cooperate may be found in the aforesaid patents.

In accordance with the present invention, there is only one gathering ram employed which is used in turn with a plurality of shaping devices. The shaping devices travel continuously, and the ram travels with those devices while it is delivering glass thereto, then travels into an adjacent furnace, moves, while gathering glass, in a direction opposite to the movement of the glass shaping devices, and then returns with the gathered glass from the furnace to the path of the shaping devices. This method of operation is one of the features of the invention, and the mechanism by which it is carried out is another feature of the invention. Details and other objects of the invention will more fully appear as the description proceeds.

In the accompanying drawings forming a part of this specification—

Figure 1 is a plan view of the improved mechanism for operating the ram together with a diagrammatic showing of the ram and associated glass shaping mechanism and glass furnace;

Figure 2 is a vertical section of the parts shown in Fig. 1, taken longitudinally beside the ram; and Figures 3 and 4 are detail views similar to Fig. 1, but showing the parts in different positions.

In this construction there is a ram 10 which slides upon an inclined carrier 11 mounted to oscillate about a column 12. Within column 12 there is a hollow shaft 13 on the upper end of which there is mounted a cam plate 14. Within the hollow shaft 13 there is a shaft 15 upon the upper end of which there is an eccentric 16 operating a rod 17 in connection with the operation of the ram. Beneath carrier 11 there is a rotatable turret 18 carrying a plurality of glass shaping units, those indicated on Fig. 1 being designated 19a, 19b and 19c. There may be one or more glass shaping devices in connection with each unit, but in the construction illustrated there are shown two glass receiving spindles 20 in connection with each unit. These spindles are adapted to receive glass from the gathering ram, manipulate the gatherers, and ultimately shape into the desired articles, the details of this operation forming no part of the present invention.

The ram carries two gathering cups 21, and is moved longitudinally of inclined carrier 11 by a rack 22 which engages a gear 23 on a stub shaft 24, which also carries a smaller gear 25 engaging a rack 26 on a slide 27. Slide 27 has on its upper side a roller 28 working in a slideway 29 in a slide 30, which is mounted in a guideway 31 in a stationary member 32. Cam plate 14 has on its lower side a cam groove 33 which operates a roller 34 on the upper side of slide 30. In the construction shown, cam groove 33 is shaped with two equal parts, so that it repeats its operation twice for one revolution of the plate, sliding the ram outward and inward twice for each revolution of shaft 13 and plate 14. Mounted in member 32 there is a vertical rock shaft 35 on the upper end of which there is an arm 36 carrying a roller 37 which is operated by a cam groove 38 on the upper side of plate 14. On its lower end, rock shaft 35 carries an arm 39 connected by a link 40 to ram 10. Cam groove 38 is likewise shaped with two equal parts so as to repeat its cycle of movements twice during each revolution of plate 14.

The operation of the device will be fairly apparent from the description given, but may be briefly summarized as follows:

Beginning with the position shown in Fig. 4, and in the dotted line position of the rams in Fig. 2, it will be seen that the gathering cups 21 are dipping into the glass. At this time roller 37 is operated by cam 38 to move the ram in a reverse direction from that in which the glass shaping devices are moved. The gathering cups thus move, during the gathering operation, in the dotted line paths designated 41 on Fig. 1, during which time they are actually in contact with the glass. This tends to set up a current of glass in the pool. When they reach the end of this portion of their travel, roller 37 encounters a concentric portion of the cam groove 38 while roller 34 is moved by cam groove 33 to withdraw the ram from the furnace into the position in which it is shown in Fig. 1, the parts being timed so that the gathering cups 21 then register with the glass receiving members 20. Roller 37 then is operated by cam groove 38 to move the ram and its carrier 11 synchronously with the shaping devices during the portion of their dotted line travel designated on Fig. 1 by 42. During this time the glass is dropped from the gathering cups and taken by the receiving members 20. At the end of this portion of travel of the gathering cups, roller 37 enters another concentric portion of groove 38 while roller 34 is operated by groove 33 to move the ram outward and return it to the position in which it is shown in Fig. 4, whereupon the operation is repeated.

By this construction and arrangement the glass is delivered to the shaping devices without halting the movement of these devices and with the delivering cups moving in synchronism with the receiving members. Thereafter the gathering cups are moved into the furnace and, while gathering, are moved over the surface of the glass in a direction opposite to the direction in which the glass shaping devices move, and then are returned out of the furnace to register with the shaping devices. In this way, there is but one ram necessary for each shaping mechanism, although in the form illustrated there are two gathering cups on each ram and two glass receiving members on each shaping device. This results in the gathering ram being in substantially constant use and sufficiently heated by the glass so that no extra heating is required to keep the gathering cups at the proper working temperature for rapid operation. In fact during normal operation, cooling is desirable, or even necessary, and may be accomplished in any suitable manner. At the same time the cups are moved through the glass while gathering in such a way as to set up a circulation of the glass whereby the glass cut from the cup, as the cup is withdrawn from the furnace, is carried on beyond the point where the cup will next engage the glass. In this way the cut-off glass is given ample time for remelting before it again returns to the path of the gathering cup, or, if desired, means may be employed to prevent any portion of the glass, chilled by cutting, from returning to the path of the gathering cup. By movement of the gathering devices with the receiving members during the discharge operation and in a direction opposite thereto during gathering operation, the desired movement of the cups during both operations is accomplished with a minimum of total movement of the cups.

While one mechanism for embodying this invention has been described in considerable detail, it will be understood that other operating devices may be employed within the terms of the appended claims.

What is claimed is:

1. The method of gathering glass from a pool and delivering it to a series of receivers, moving past the pool, by a gathering device, which consists in moving the gathering device over the pool, while gathering, in a direction opposite to the direction of movement of the receiving devices, then from the pool to registration with a receiving device, then in synchronism with and over the receiving device for a material distance and in vertical alignment therewith while delivering gathered glass thereto, then directly back over the pool to the starting point, and repeating the cycle and delivering a gather to another glass receiver.

2. In combination, a receptacle for a pool of glass, a glass gathering device, a glass receiver, means to move the receiver past the receptacle, and means to move the gathering device with and in vertical alignment over the receiver as it passes the receptacle, then into the receptacle and into contact with the glass, then in a direction opposite to the direction of movement of the receiver, and then from the receptacle into registry with the path of the receiver.

3. In combination, a receptacle for a pool of glass, an endless series of glass receivers, means to move the receivers in succession past the receptacle, a gathering device, and means to move said device in a substantially rectangular path, two parallel sides of which overlie the pool and the path of the receivers, respectively.

4. In combination with a rotatable turret carrying glass-shaping device, a gathering ram mounted above one side of the turret, means for reciprocating the ram radially of the turret and means for oscillating the ram with the turret, the oscillating means being timed with said reciprocating means to move the ram with the turret while in its inward position and in the opposite direction while it is in its outward position.

ALVAH C. PARKER.